(12) United States Patent
Leijnen (10) Patent No.: US 12,160,155 B2
(45) Date of Patent: Dec. 3, 2024

(54) COOLING MECHANISM OF A STATOR FOR AN AXIAL FLUX MACHINE

(71) Applicant: MAGNAX BV, Kortrijk (BE)

(72) Inventor: Peter Leijnen, Bachte-Maria-Leerne (BE)

(73) Assignee: MAGNAX BV, Kortrijk (BE)

( * ) Notice: Subject to any disclaimer, the term of this patent is extended or adjusted under 35 U.S.C. 154(b) by 303 days.

(21) Appl. No.: 17/625,047

(22) PCT Filed: Jul. 8, 2020

(86) PCT No.: PCT/EP2020/069177
§ 371 (c)(1),
(2) Date: Jan. 5, 2022

(87) PCT Pub. No.: WO2021/005084
PCT Pub. Date: Jan. 14, 2021

(65) Prior Publication Data
US 2022/0286001 A1     Sep. 8, 2022

(30) Foreign Application Priority Data

Jul. 10, 2019   (EP) .................................. 19185499

(51) Int. Cl.
*H02K 1/20*     (2006.01)
*H02K 3/24*     (2006.01)
(Continued)

(52) U.S. Cl.
CPC ............ *H02K 5/203* (2021.01); *H02K 1/20* (2013.01); *H02K 3/24* (2013.01); *H02K 3/28* (2013.01); *H02K 9/197* (2013.01)

(58) Field of Classification Search
CPC ........ H02K 1/141; H02K 1/148; H02K 1/182; H02K 1/20; H02K 3/24; H02K 3/28;
(Continued)

(56) References Cited

U.S. PATENT DOCUMENTS 4,703,211 A * 10/1987 Yazaki ..................... H02K 3/47
                                                          310/216.115
5,325,007 A *  6/1994 Huss ........................ H02K 3/46
                                                          310/43
(Continued)

FOREIGN PATENT DOCUMENTS

CN     109474114 A     3/2019
DE   102014221648 A1   4/2016
(Continued)

OTHER PUBLICATIONS

GB-2546255-A_Translation (Year: 2023).*
(Continued)

*Primary Examiner* — Naishadh N Desai
*Assistant Examiner* — Ahmed F Seck
(74) *Attorney, Agent, or Firm* — Workman Nydegger (57) ABSTRACT

A stator for an axial flux machine includes a central axis corresponding to the rotational axis of the axial flux machine; and ports for supplying and draining a cooling fluid; and an outer structure comprising an outer cooling channel to let the cooling fluid flow tangentially about the central axis; and the inner structure comprising an inner cooling channel to let the cooling fluid flow tangentially about the central axis; and the intermediate structure comprising symmetrically arranged stator members. A stator member has a ferromagnetic core, and a coil includes turns wound around the ferromagnetic core. The stator further has guiding walls configured to guide the cooling fluid between the outer and the inner cooling channels.

13 Claims, 9 Drawing Sheets

(51) Int. Cl.
*H02K 3/28* (2006.01)
*H02K 5/20* (2006.01)
*H02K 9/197* (2006.01)

(58) Field of Classification Search
CPC ............ H02K 5/18; H02K 5/20; H02K 5/203;
H02K 9/04; H02K 9/19; H02K 9/193;
H02K 9/197; H02K 9/223; H02K 9/225;
H02K 9/227
USPC .......................................................... 310/215
See application file for complete search history.

(56) References Cited

U.S. PATENT DOCUMENTS

| | | | |
|---|---|---|---|
| 2016/0226327 A1* | 8/2016 | Rippel .................... | H02K 9/197 |
| 2016/0329796 A1* | 11/2016 | Hano ...................... | H02K 15/02 |
| 2016/0365755 A1* | 12/2016 | Long ...................... | H02K 15/0478 |
| 2017/0237327 A1 | 8/2017 | Inoue et al. | |
| 2018/0367003 A1* | 12/2018 | Rippel .................... | H02K 1/20 |
| 2019/0058431 A1* | 2/2019 | Mao ....................... | H02K 15/024 |
| 2021/0211033 A1* | 7/2021 | Catalan ................. | H02K 1/2753 |

FOREIGN PATENT DOCUMENTS

| | | | | |
|---|---|---|---|---|
| GB | 2546255 A | * | 7/2017 | ............... H02K 1/20 |
| WO | 2010092400 A2 | | 8/2010 | |
| WO | WO-2010092403 A2 | * | 8/2010 | ............. H02K 1/182 |
| WO | WO-2015124922 A1 | * | 8/2015 | ............... H02K 1/12 |
| WO | WO-2016067718 A1 | * | 5/2016 | ............... H02K 1/20 |
| WO | WO2016150736 A1 | * | 9/2016 | ............. H02K 5/203 |
| WO | WO-2016156886 A1 | * | 10/2016 | |

OTHER PUBLICATIONS

WO2016150736A1_Translation (Year: 2023).*
17625047_2024-08-07_WO_2010092403_A2_H.pdf (Year: 2024).*
17625047_2024-08-07_WO_2015124922_A1_H.pdf (Year: 2024).*
17625047_2024-08-07_WO_2016156886_A1_H.pdf (Year: 2024).*
17625047_2024-08-07_WO_2016067718_A1_H.pdf (Year: 2024).*
Extended European Search Report and Written Opinion from corresponding Application No. EP19185499.1, Nov. 12, 2019.
International Search Report and Written Opinion from PCT Application No. PCT/EP2020/069177, Jul. 27, 2020.

* cited by examiner

COOLING MECHANISM OF A STATOR FOR AN AXIAL FLUX MACHINE

FIELD OF THE INVENTION

The present invention generally relates to the field of stators for axial flux machines. More specifically, the present invention relates to a cooling mechanism for cooling such a stator and a method thereof.

BACKGROUND OF THE INVENTION

An axial flux machine is a type of electrical machine known in the art under a variety of different terms. In particular, but not exclusively limited thereto, it is nominated as a yokeless and segmented armature (YASA) motor or generator, a yokeless axial flux machine, an axial air-gap electronic motor or generator, an axial flux permanent magnet machine, or merely an axial flux machine. These terms may indicate a particular embodiment of such a machine, yet, in the continuation of this text, the term axial flux machine will be used. Nevertheless, it is appreciated that the basic principles of an axial flux machine remain applicable.

The basic principles are, broadly, that an axial flux machine comprises a disc- or ring-shaped rotor and stator structure coaxially arranged with a central axis. Typically, the stator comprises a plurality of stator elements, each comprising a coil and a ferromagnetic core rotational symmetrical arranged about said central axis and the rotor comprises a set of permanent magnets mounted on a bearing such that it may rotate about the central axis. Depending on the working condition, the rotor is either driven by fields originating from the stator, thus the machine is operating as a motor, or driven by an external force, such as a windmill, thus operating as a generator. An axial flux machine compared to other electrical machines has a higher power density. In other words, it is a lighter machine but having a similar power compared to other machines.

When the axial flux machine operates, heat is dissipated inside the stator thereof. For reasons of safety, but also for the efficiency of the machine, the heat needs to be evacuated. For example, in WO2010/092400 a stator is disclosed wherein an axial flux machine comprises a stator housing having two annular plates and two cylindrical walls. The annular plates comprise pockets to receive a shoe of a stator element and serve to locate the plurality of stator elements when two clam shell housings of the stator are assembled together. Furthermore, when assembled, the stator housing is provided with ports that allow a cooling fluid, such as an electrically non-conducting liquid, to be pumped into the spaces between the stator elements in order to cool them.

Thus, for evacuating the dissipated heat, the cooling fluid is pumped through the stator and when the heat is absorbed, the cooling fluid is drained away. However, a drawback is that the cooling fluid will flow inside the stator in an uncontrolled manner leading to local flow vortices which can cause large temperature gradients in the stator. This may lead to undesired situations, such as a concentration of heat at dedicated spots, which may deteriorate the functioning of the stator. This leads to an inefficient use of the cooling fluid, which results in a stator with less capacity for evacuating the dissipated heat, and therefore to lower power and efficiency. A similar solution, with similar corresponding drawbacks, is disclosed in CN 109 474 114.

Another solution is presented in DE10 2014 221648. It discloses a cooling channel arrangement with an L-shaped or U-shaped cross section, targeting an improved cooling of the stator core up to areas close to the air gap between stator and rotor. The cooling channel arrangement comprises two channels in circumferential direction, and channels in radial direction connecting both circumferential channels. The cooling channel arrangement is bordered, and the radial channels are located in the cover of the stator, at the outer surface of the stator. Thus, the available cooling channels are completely separated from the coils, and a fluid flowing in the cooling channels does not make any contact with the coils. Consequently, no efficient cooling of the coils is obtained.

It is therefore an objective of the present invention to alleviate the above drawbacks and to provide a stator having an improved cooling system.

SUMMARY OF THE INVENTION

This objective is achieved, according to a first aspect, by a stator for an axial flux machine, the stator comprising:
- a central axis which corresponds to the rotational axis of the axial flux machine when mounted; and
- a first and a second port for supplying and draining a cooling fluid; and
- an inner structure, an intermediate structure and an outer structure arranged coaxially around the central axis, the intermediate structure being arranged between the inner structure and the outer structure; wherein
  the outer structure comprises:
    an outer cooling channel configured to let the cooling fluid flow tangentially about the central axis; and
  the inner structure comprises:
    an inner cooling channel configured to let the cooling fluid flow tangentially about the central axis; and
  the intermediate structure comprises:
    a plurality of symmetrical arranged stator members, wherein a stator member comprises a ferromagnetic core and a coil comprising a plurality of turns wound around the ferromagnetic core;

CHARACTERISED IN THAT the stator further comprises a plurality of guiding walls located between the stator members, thereby defining fluid passages between the outer and the inner cooling channel, such that a fluid flowing through the fluid passages is forced to flow against the coils.

The stator comprises three main parts, namely an inner structure, an intermediate structure and an outer structure. These three parts are coaxially arranged around the rotational axis of the axial flux machine when mounted as the common central axis. More in particular, the inner structure is positioned the closest to the central axis, the outer structure the most distant from the central axis and the intermediate structure in between the inner and outer structure.

The stator further comprises two ports for supplying and draining a cooling fluid. For example, a first port supplies the cooling fluid into the stator and a second port drains the cooling fluid out of the stator. The functioning of the first and the second port may also be reversed, namely that the first port is for draining and the second port is for supplying. It should thus be further understood that the stator comprises two ports for letting circulate a cooling fluid through the stator. The circulating may further be driven by an external pump, whereby the external pump does not form part of the stator. The first and the second port may be arranged at different locations of the stator, which will be further illustrated by different embodiments.

The outer structure comprises an outer cooling channel through which the cooling fluid may flow. When flowing, the cooling fluid flows tangentially about the central axis, this is, describing a circular movement around the central axis.

The inner structure comprises likewise a cooling channel, the inner cooling channel, through which the cooling fluid flows in a tangentially direction around the central axis, this is, describing a circular movement around the central axis.

The intermediate structure comprises a plurality of symmetrical arranged stator members. A stator member comprises a ferromagnetic core and a plurality of turns wound around the ferromagnetic core. This way, the turns form a coil wound around the core. Thus, the ferromagnetic core and the coil form an electromagnet suitable for the axial flux machine.

The stator is further characterized in that it comprises a plurality of guiding walls. The guiding walls are located between the stator members. As such, they define fluid passages between the outer and the inner cooling channel. This means that a cooling fluid flows in between adjacent stator members, from the outer to the inner cooling channel or vice versa, thereby being guided by the guiding walls.

Thus, the cooling fluid flows through the inner and outer cooling channels in a tangential direction around the central axis. Next, the cooling fluid is forced to flow radially through the stator between the inner and outer cooling channels. The forcing is achieved by the guiding walls which are configured to guide the cooling fluid in a controlled manner between the inner and the outer channels.

The guiding walls are designed in such a way that they are adapted to the fluid dynamics of the cooling fluid, to the flow rate exerted by the force of the external pump, and to the dimensions of the cooling channels. The shape of the guiding walls and the material thereof are thus adapted to these just listed parameters.

The guiding walls are further adapted to either guide the cooling fluid from the outer to the inner cooling channel, from the inner cooling channel to the outer cooling channel, or to guide the cooling fluid in both directions whereby the flow of direction will be determined by the forces exerted on the cooling fluid and on the location of the first and second port. This will be further illustrated by different embodiments of the stator.

Different advantages are identified. Firstly, instead of only providing an inner and outer cooling channels with spaces between the coils, the guiding walls force the cooling fluid to flow in a predetermined manner between the inner and outer channels. Thus, instead of relying on uncontrolled flow of the cooling fluid, the flow is forced, thereby controlling both the path and the flowing speed of the fluid at specific location within the stator. This way, the path and speed of the cooling medium fluid may be optimized to extract a maximum amount of heat from the stator.

Secondly, since the path and the speed of the flow is controlled, the time within which the cooling fluid will stay within the stator may likewise be controlled by the forces exerted thereon. This way, either the cooling fluid in terms of its cooling capacity may be adapted to this time, or, otherwise, the time may be adapted on the cooling capacity of the cooling fluid.

Thirdly, since the fluid path and the speed at specific location within the stator are controlled, the cooling of the stator is efficiently controlled as well. The advantage thereof is that heat concentrations are avoided, and the temperature gradients in the stator may be limited to a desired level.

The guiding walls are positioned such that a fluid flowing through the fluid passages is forced to flow against the coils. This means that, while flowing in between the stator members, the fluid is forced to flow against the coils, alongside turns of the coils. Thus, when the guiding walls guide the cooling fluid between the inner and outer channels, the cooling fluid is further forced against the coils, thereby increasing the fraction of the fluid that directly comes into contact with the coils, and minimizing the fraction of the fluid that passes by the coils without coming into direct contact with the coils.

Thus, instead of only a small portion of the pumped cooling fluid that is able to absorb heat, due to a gap that exists between the stator elements in stator known in the art, whereby the gap allows most of the fluid to pass between the stator elements unrestricted, and without necessarily coming into contact with the coils, the guiding walls ensure that a substantial portion of the cooling fluid is forced to flow against the coils.

When the axial flux machine is operating, an electrical current flows through the coils, and due to the copper losses, heat is dissipated. Because of this, the coils need to be cooled. Thus, by forcing the cooling fluid to flow against the coils, the coils will be cooled in an efficient manner.

According to an embodiment, each of the guiding walls is located between two adjacent stator members, and extends in radial direction. For example, in an embodiment, a guiding wall may have an elongated body, which extends in radial direction. In an embodiment, stator elements and guiding walls alternate, i.e. a guiding wall is present between each pair of adjacent stator members. The guiding walls may be placed according to a rotational symmetrical pattern about the central axis.

According to an embodiment, the turns are arranged to shape a spacing between two or more adjacently wound consecutive turns of a coil, a spacing arranged to shape radial channels as fluid passages between the outer and inner cooling channels; and wherein the guiding walls are further configured to force the cooling fluid to flow through the radial channels.

When the turns are wound around the ferromagnetic core, thereby forming the coil, the turns are positioned or arranged such that channels are formed in the coil. These channels, the radial channels, are further configured such that the cooling fluid may flow therein. In the continuation of the text the term fluid passages will thus also be used to indicate the radial channels. Furthermore, the guiding walls are configured such that when they guide the cooling fluid, it is guided towards and inside the radial channels. This way, the surface area of the coil and of the core which is in contact with the cooling fluid is enlarged and as a consequence the heat dissipated by the coil and/or ferromagnetic core may be drained in an even more efficient manner.

According to an embodiment, the turns have a tapered cross-section comprising a first end larger than a second end, the first end facing the ferromagnetic core when wound such that the radial channels comprise a V-shaped cross section.

Preferably, the turns have a tapered cross-section wherein one end, the first end, is larger than an opposite end, the second end. The shape of the cross-section is thus tapered, flattened, or truncated. In other words, the tapered shape comprises a variety of shapes, such as a triangular shape or an L-shape, whereby the corners between sides may further be rounded. When the turns are wound thereby forming the radial channels, the larger end, the first end, of the cross-section faces towards the ferromagnetic core and the smaller end, the second end, faces away from the ferromagnetic core. This way, the radial channels have a V-shaped cross section. The V-shape means that the width of the radial channels becomes larger when moving away from the circumference of the ferromagnetic core. This way, the surface area of the coil which is in contact with the cooling fluid is further enlarged, thereby further enhancing the transfer of heat from the coil of the fluid.

Different embodiments of the stator, whereby the first and second port for supplying and draining the cooling fluid are positioned at dedicated spots, will now be further discussed.

According to an embodiment, the outer cooling channel comprises the first port, and the inner cooling channel comprises the second port, such that a fluid flowing through the fluid passages all flows from the outer cooling channel to the inner cooling channel or vice versa.

Thus, the first port is coupled or connected to the outer cooling channel. Through this first port, the cooling fluid may be supplied or drained to the outer cooling channel. Next, the second port is coupled to the inner cooling channel. Depending on the functioning of the first port, i.e. draining or supplying the cooling fluid, the functioning of the second port will be complemental. Thus, when the first port is used for supplying the cooling fluid, the second port will drain the cooling fluid, or vice versa.

The cooling fluid flows between the outer and the inner cooling channel in radial direction. The cooling fluid flows from the outer cooling channel to the inner cooling channel or vice versa.

When the first port is for supplying the cooling fluid, the cooling fluid enters the stator in the outer cooling channel and the guiding walls guide the cooling fluid towards the inner cooling channel. Next, the cooling fluid is drained from the stator by the second port coupled to the inner cooling channel. When the cooling fluid is in the stator, it absorbs the dissipated heat therein and the heat is thus drained away from the stator. Next, when the cooling fluid is again cooled down outside the stator, it becomes again suitable for supplying it to the stator. As already highlighted, the supplying of the cooling fluid may be performed through the inner cooling channel and guided to the outer cooling channel for draining it.

According to another embodiment, the outer channel comprises a partition thereby forming a first partitioned outer channel and a second partitioned outer channel, the first partitioned outer channel comprising the first port, and the second partitioned outer channel comprising the second port, such that the fluid passages are arranged according to an alternating pattern, comprising fluid passages through which fluid flows from the first partitioned outer channel to the inner cooling channel, and fluid passages through which fluid flows from the inner cooling channel to the second partitioned outer channel.

The partition divides the outer channel into two adjacent outer channels, namely the first and second partitioned outer channel. Next, the first and second port are respectively connected or coupled to the first and second partitioned outer channel. To the inner channel no port is connected or coupled.

To the first port the cooling fluid is supplied and via the second port the cooling fluid is drained. As already highlighted, the functioning of the ports may be reversed. The embodiment will now be discussed wherein the first port is functioning as the supplying port.

The cooling fluid is supplied through the first port and enters the stator via the first partitioned outer channel. Next, the guiding walls guide the cooling fluid to the inner cooling channel through the intermediate structure.

The inner cooling channel receives the cooling fluid and, next, the guiding walls guide the fluid to the second partitioned outer channel through the intermediate structure. The cooling fluid thus follow the path from the first partitioned outer cooling channel through the intermediate structure to the inner cooling channel and back again to the second partitioned outer cooling channel.

To avoid that the cooling fluid is guided through the intermediate structure in two opposite directions within a same fluid passage, the guiding walls are further configured to guide the cooling fluid in a radially alternating direction alongside a rotational symmetrical pattern. For example, adjacent fluid passages through the intermediate structure are at an ending pointing to the outer cooling channel in an alternative manner coupled to the first respectively second partitioned outer cooling channel. This way, an alternating pattern of fluid passages connecting the first partitioned outer cooling channel to the inner cooling channel respectively the second partitioned outer cooling channel to the inner cooling channel arises.

According to an embodiment, the intermediate structure further comprises an annular cover arranged to seal outside surfaces of the stator.

To ensure that the cooling fluid remains in the stator, the intermediate structure is further covered by an annular cover sealing the stator at the outside surfaces thereof. This annular cover may comprise a complete unity. Alternatively, the annular cover may comprise a plurality of structural elements which together form the annular cover. The structural elements are then placed at the outside surfaces thereby composing the annular cover.

According to an embodiment the outer structure comprises a plurality of structural modules configured to compose the outer structure.

The outer structure comprising the outer cooling channel, whether or not partitioned, may be composed out of a plurality of building blocks, the structural modules, which may be coupled and/or connected together thereby comprising the outer structure.

According to an embodiment, the guiding walls comprise an electrically insulating material.

By using electrically insulating materials, the guiding walls will not influence the functioning of the stator when used in an axial flux machine. Furthermore, this increases the safety thereof.

The guiding walls may comprise, for example, a polymer. This is also an advantage, since it will reduce the weight of the stator.

According to an embodiment, the guiding walls have a thickness of around 0.1 mm to around 1.0 mm, preferably of around 0.5 mm.

According to a second aspect, the invention relates to an axial flux machine comprising the stator according to the first aspect.

According to a third aspect, the invention relates to a method for cooling a stator for an axial flux machine according to the first aspect, the method comprising the steps of:
  letting a cooling fluid flow tangentially about the central axis through the outer and inner cooling channel; and
  letting the cooling fluid flow between the outer and the inner cooling channel through the fluid passages defined by the guiding walls, thereby forcing it to flow against the coils.

BRIEF DESCRIPTION OF THE DRAWINGS

Some example embodiments will now be described with reference to the accompanying drawings.

DETAILED DESCRIPTION OF EMBODIMENT(S)

Figure 1:
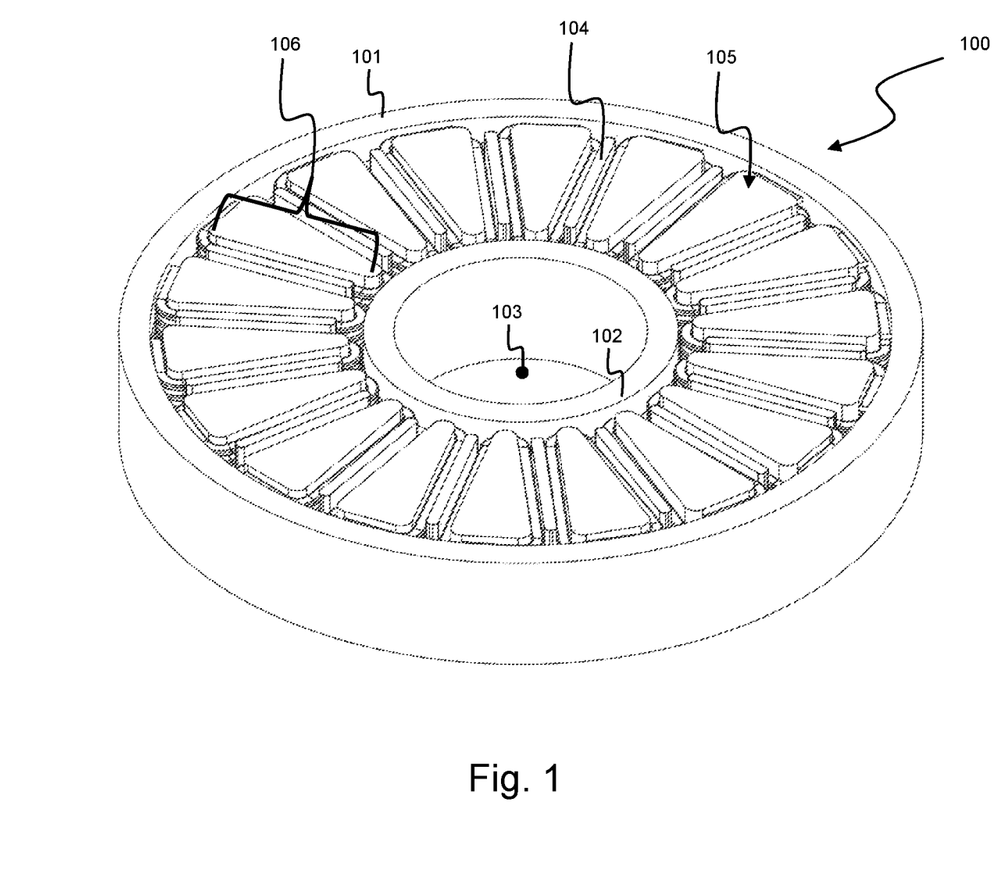
FIG. 1 illustrates a stator for an axial flux machine according to an embodiment of the invention.

In FIG. 1 a stator for an axial flux machine is illustrated. The stator 100 comprises a central axis 103 which corresponds to the central axis of the axial flux machine when the stator 100 is mounted therein. The stator 100 further comprises an outer structure 101, an inner structure 102 and an intermediate structure 106. The intermediate structure 106 comprises a plurality of symmetrically arranged stator elements, such as stator element 105. The stator element 105 is further illustrated in FIG. 5. The stator element 105 comprises a ferromagnetic core 500 and turns 501-504 wound around the ferromagnetic core 500 thereby forming an electromagnet. The stator 100 further comprises guiding walls, such as guiding wall 104. In the embodiment of FIG. 1, the guiding walls 104 have an elongated shape, extending in radial direction. Moreover, a guiding wall 104 is positioned between each pair of adjacent stator elements 105.

Figure 2:
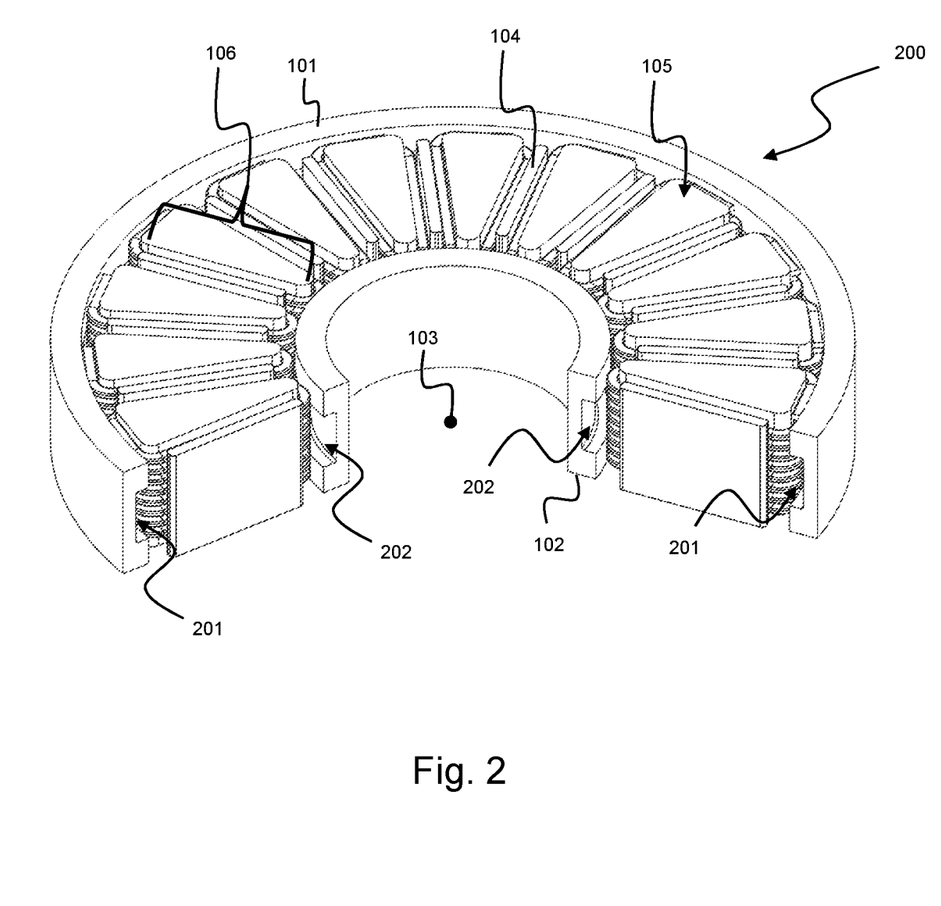
FIG. 2 illustrates a stator for an axial flux machine with an open cross section for illustrative purposes comprising an outer cooling channel.

In FIG. 2 the stator is further illustrated with an open section thereof 200 for illustrative purposes. In this illustrative view, it can be observed that the outer structure 101 comprises an outer cooling channel 201 and that the inner structure 102 comprises an inner cooling channel 202. Both the outer 201 and the inner 202 cooling channel extend tangentially about the central axis 103 and are arranged to let a cooling fluid flow tangential about the central axis 103. The guiding walls 104 are further arranged to let the cooling fluid flow between the outer 101 and the inner 102 structure through the intermediate structure 106 to cool the stator elements 105, and in particular the turns 501-504 thereof. The paths that the cooling fluid follows will now further be illustrated with reference to FIG. 6.

Figure 6:
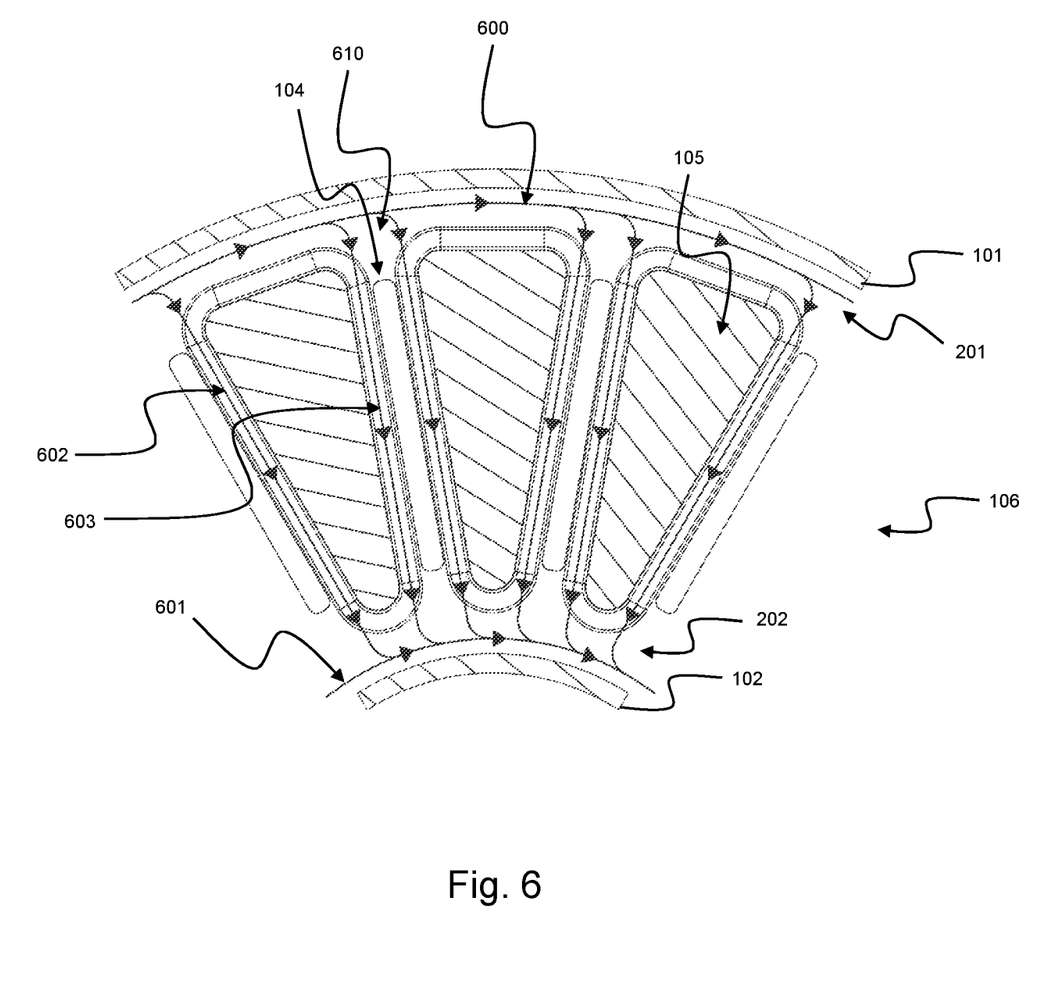
FIG. 6 illustrates pathways of a flow of a cooling fluid in the stator according to an embodiment comprising an outer cooling channel.

In FIG. 6 paths or pathways of a flow of a cooling fluid in the stator 200 according to the embodiment of FIG. 2 are illustrated. The paths that the cooling fluid follows are illustrated by lines comprising arrows, such as line 600 at the outer cooling channel 201, and lines 602 and 603 at the intermediate structure 106. In this embodiment, the cooling fluid is supplied to the outer cooling channel 201 via a supplying port. This supplying port is not illustrated, but it should be appreciated that the supplying port is a port known in the art for supplying a cooling fluid to a stator of an axial flux machine.

The cooling fluid is supplied to the outer cooling channel 201 and circulates in the outer cooling channel 201 tangentially about the central axis 103 of the stator 100, 200, as illustrated by line 600. When the cooling fluid passes a fluid passage between the outer 201 and inner 202 cooling channel, such as fluid passage 610, the guiding walls, such as guiding wall 104, guide the cooling fluid to the intermediate structure 106 against the turns 501-504 of a stator element 105. This is illustrated by lines 602 and 603. This will be further illustrated with reference to FIG. 5.

Figure 5:
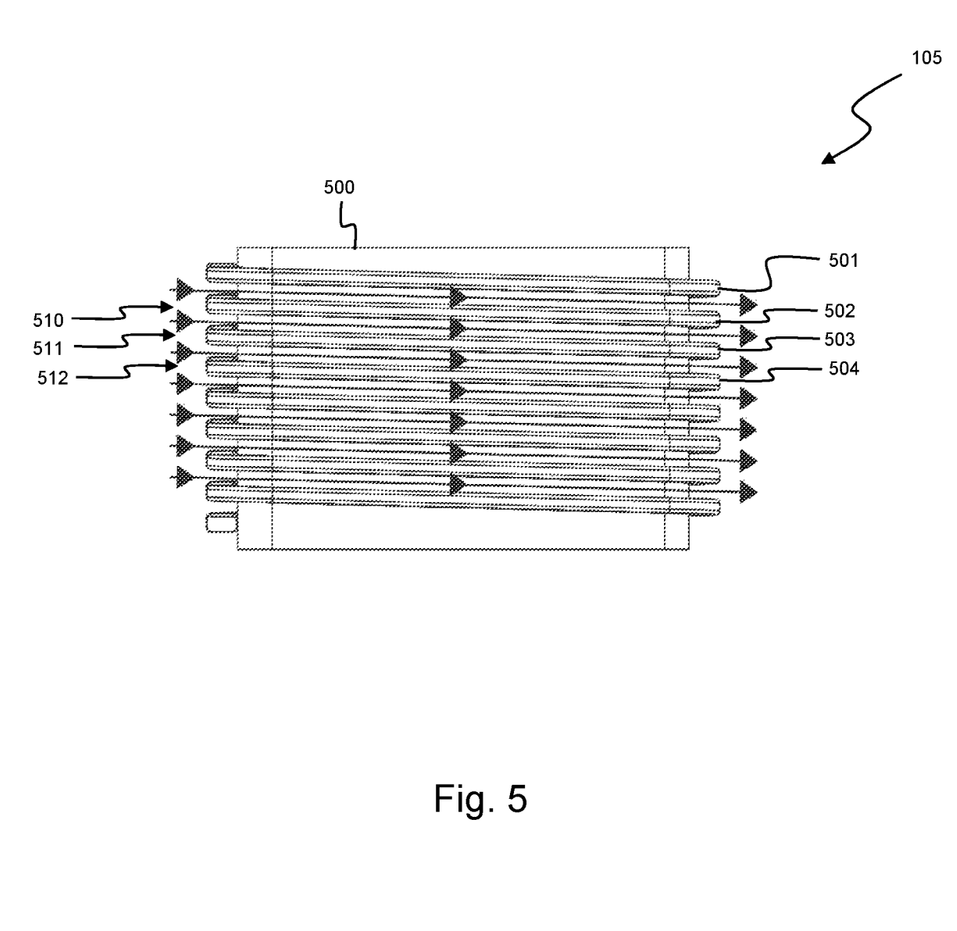
FIG. 5 illustrates turns wound around a ferromagnetic core, the turns forming radial channels.

Besides the ferromagnetic core 500 and turns 501-504 wound around the ferromagnetic core 500, the stator element 105 comprises radial channels 510-512. The radial channels 510-512 arise through the arrangement of the turns 501-504. The radial channels 510-512 form fluid passages between the outer 201 and inner 202 channel through which the cooling fluid may flow.

The shape of the radial channels 510-512 may be V-shaped, rectangular, triangular, truncated or any other shape suitable to be used as fluid passages. It should by further understood that the shape of the radial channels 510-512 is determined by the shape of the cross section of the turns 501-504 and the way that the turns 501-504 are wound around the ferromagnetic core 500. An embodiment of the radial channels will now be further illustrated with reference to FIG. 9A and FIG. 9B.

Figure 9A:
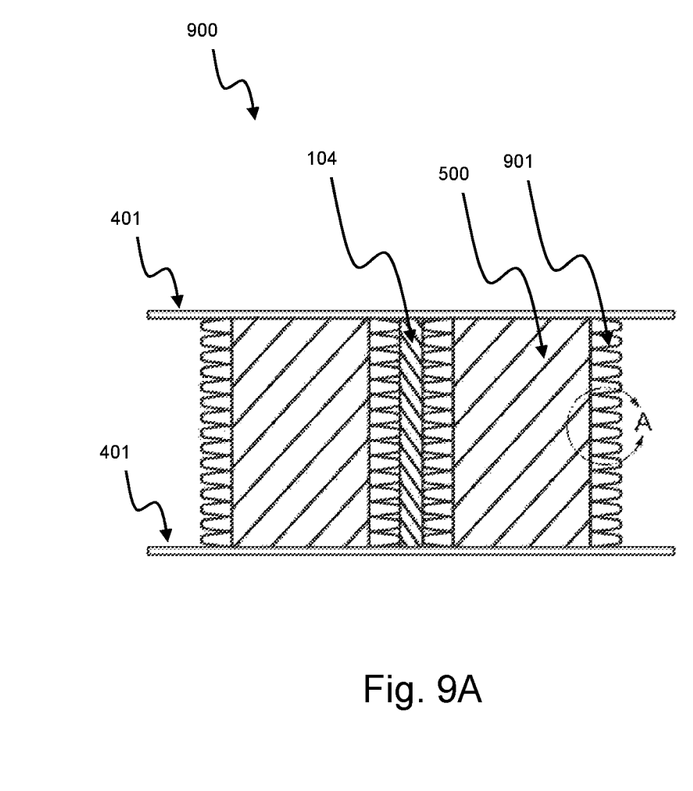
FIG. 9A illustrates stator members comprising turns with a V-shaped cross-section.
Figure 9B:
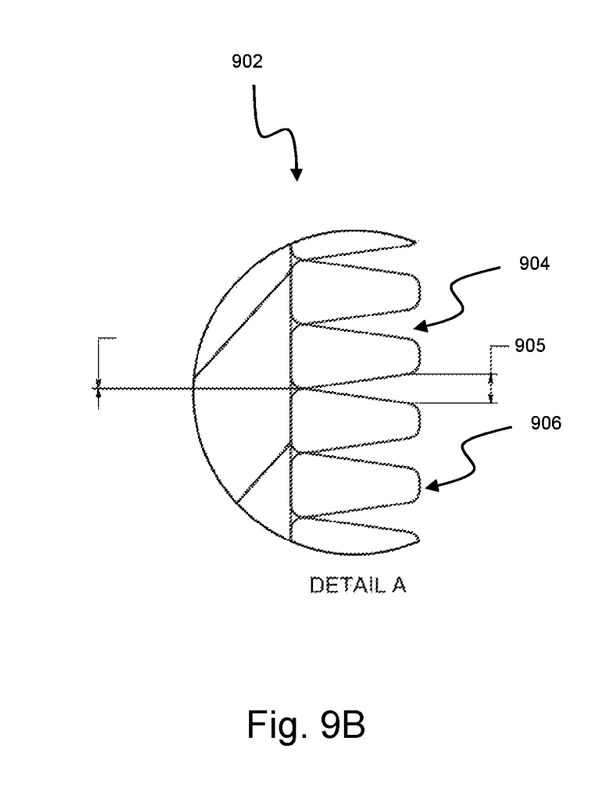
FIG. 9B illustrates a detailed view of turns comprising a V-shaped cross-section.

In FIG. 9A a cross-section of the intermediate structure 106 is illustrated. The illustrated cross-section 900 comprises two stator elements, each comprising a set of turns and a guiding wall 104 between the coils of the stator elements. The illustration further comprises a sealing 401 on the upper and lower side which will further be illustrated with reference to FIG. 4. The turns 901 illustrated on the right side of FIG. 9A will now be discussed with reference to detail A 902, which is further illustrated in FIG. 9B. The radial channel 904 is V-shaped and configured to guide a cooling fluid between the outer 201 and inner 202 structure. The width 905 at the end of the V-shape is determined by the dimensions of the turns 901. The turns 901 may further be rounded at the top 906 thereof thereby avoiding sharp edges. This reduces the risk of damaging the guiding walls 104 when the stator 100 is assembled. Further, by shaping the radial channels 904 in a V-shape, the surface for cooling the turns is enlarged, thereby enhancing the efficiency of cooling the stator elements 105 and its turns 501-504.

With again reference to FIG. 6, the cooling fluid is guided by the guiding walls 104 through the fluid passage 610 against the turns 501-505 such that the cooling fluid flows through the radial channels 510-512 into the inner 202 cooling channel. When the cooling fluid flows through the radial channels 510-512, it absorbs heat from the stator elements 105 dissipated when the stator 100, 200 operates in an axial flux machine, and in particular of the turns 501-505 thereof.

The cooling fluid is then collected in the inner cooling channel 202 illustrated by arrow 601. The cooling fluid in the inner cooling channel 202 has thus a higher temperature compared to the cooling fluid in the outer cooling channel 201. The cooling fluid is then drained away from the inner cooling channel 202 by a drainage port.

The direction of circulating may also be reversed, namely from the inner cooling channel 202 through the passages 510-512 to the outer cooling channel 201. It should however be understood that the functioning is similar as the embodiment that is illustrated.

Figure 8:
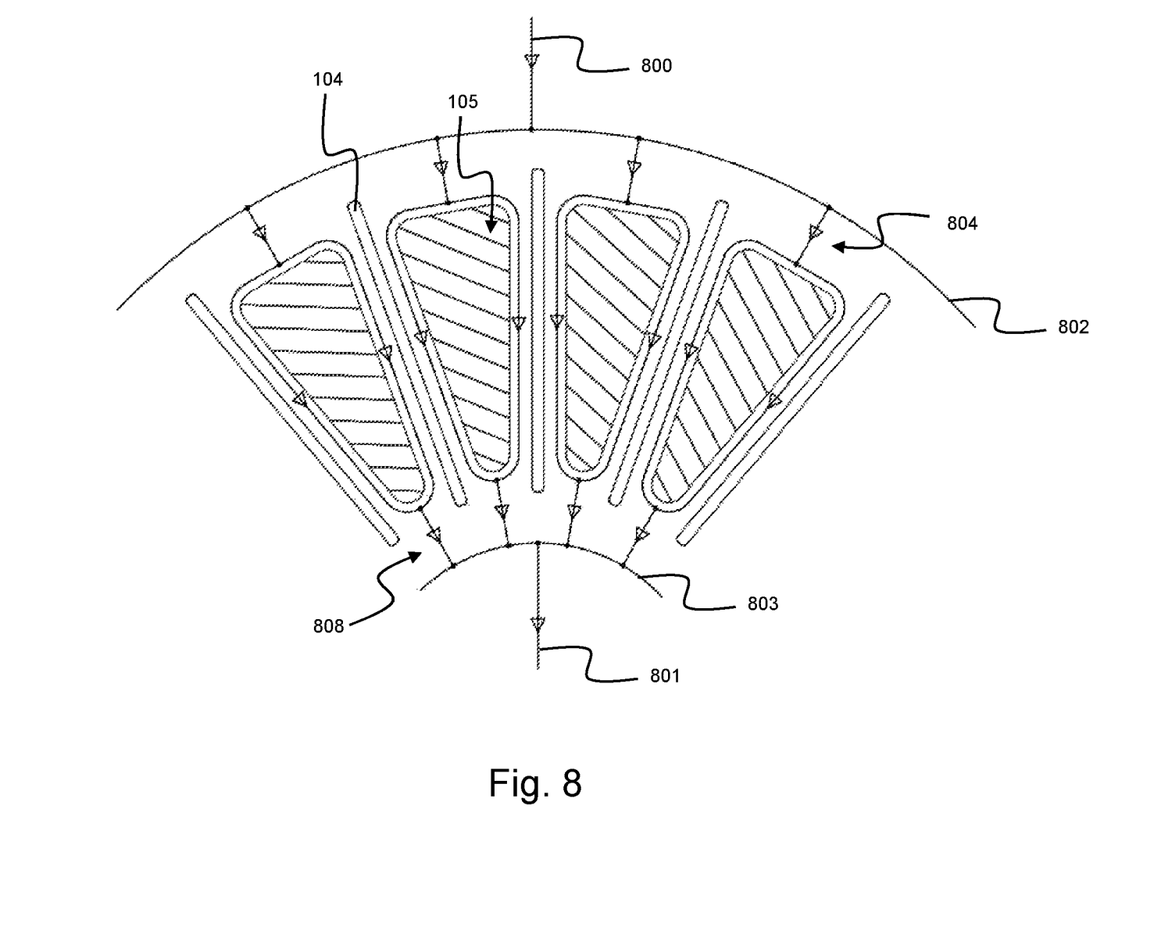
FIG. 8 illustrates pathways of a flow of a cooling fluid in the stator according to an embodiment comprising an outer cooling channel with a schematically illustration of a supplying and drainage port.

The direction of flow of the cooling fluid is further schematically illustrated in FIG. 8. Reference 800 illustrates the supplying port of the outer cooling channel 201 and reference 801 illustrates the drainage port of the inner cooling channel 202. The schematic representation of FIG. 8 thus illustrates the embodiment whereby the cooling fluid flows from the outer cooling channel 201 through the intermediate structure 106 to the inner cooling channel 202. The reference 802 illustrates the outer cooling channel 201 wherein the cooling fluid flows tangentially about the central axis 103. The cooling fluid then flows 804 through the intermediate structure 105 and enters 808 the inner cooling channel 803.

According to another embodiment, the cooling fluid may also follow another pathway than that of flowing from the outer cooling channel 201 to the inner cooling channel 202, or vice versa. This other embodiment will be illustrated with reference to FIG. 3 and to FIG. 7.

Figure 3:
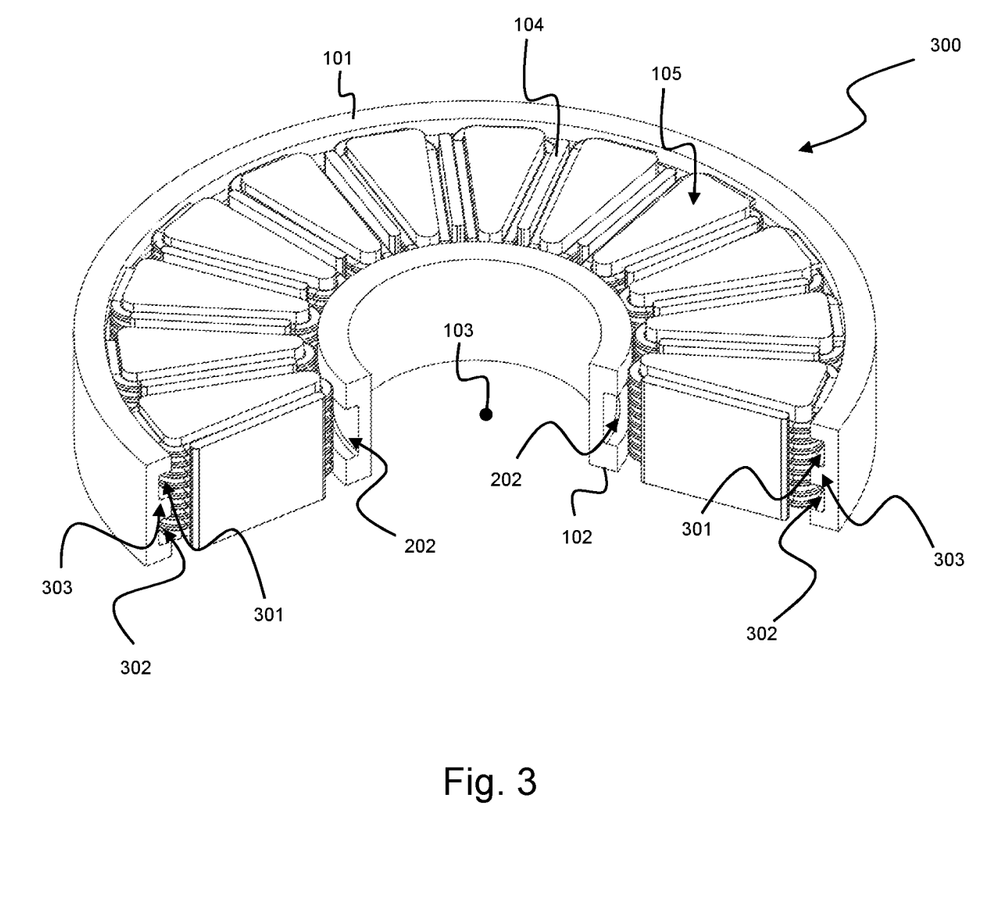
FIG. 3 illustrates a stator for an axial flux machine with an open cross section for illustrative purposes comprising a partitioned outer cooling channel.

In FIG. 3 an embodiment of the stator 300 is illustrated whereby the outer cooling channel is partitioned into two outer cooling channels 301 and 302 through partition 303. The inner cooling channel 202 comprises one partition, this is, corresponds to the inner cooling channel 202 of the embodiment illustrated in FIG. 2. The supplying and drainage ports are in this embodiment 300 connected to respectively the first 301 outer cooling channel and the second 302 outer cooling channel.

In the continuation of the discussion of this embodiment 300, it will be considered that the supplying port for supplying the cooling fluid is connected to the first outer cooling channel 301 and that the port for draining is connected to the second outer cooling channel 302. It should however be appreciated that the connection of the ports can be reversed.

Figure 7:
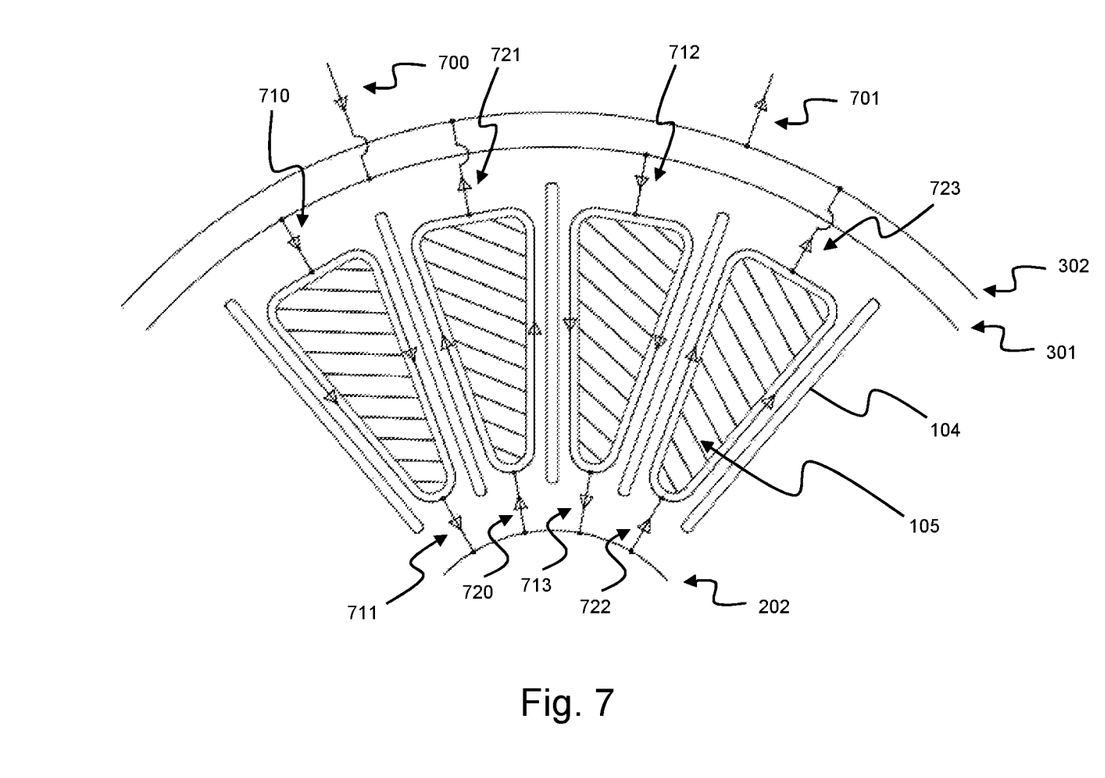
FIG. 7 illustrates pathways of a flow of a cooling fluid in the stator according to an embodiment comprising a partitioned outer cooling channel.

The pathways that the cooling fluid follows will further be illustrated with reference to FIG. 7. The cooling fluid enters the stator 300 through the supplying port 700. Next, the cooling fluid will flow through the intermediate structure 106 towards the inner cooling channel 202. In this embodiment 300 the first outer cooling channel 301 is through an alternating pattern connected to fluid passages of the intermediate structure 106. Thus, when the cooling fluid enters the first outer cooling channel 301, the cooling fluid may flow through fluid passages 710-711 and 712-713 to the inner cooling channel 202. An alternating pattern of fluid passages such as 710-711 and 712-713 are thus present. The cooling fluid in the inner cooling channel 202 then flows to the second outer cooling channel 302 via passages 720-721 and 722-723. Over the circumference of the stator a pattern thus arises of fluid passages which are in an alternating manner connecting the first outer cooling channel 301 to the inner cooling channel 202 and connecting the inner cooling channel 202 to the second outer cooling channel 302.

Figure 4:
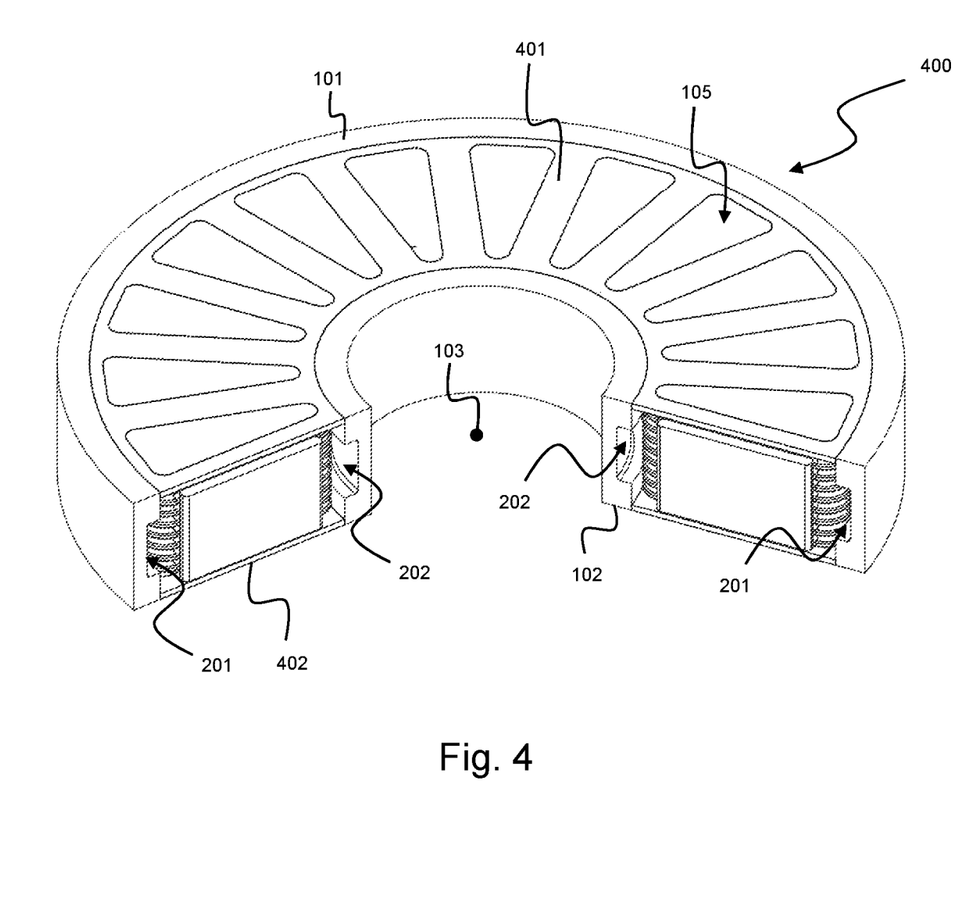
FIG. 4 illustrates a stator for an axial flux machine with an open cross section for illustrative purposes comprising an annular cover.

Now with reference to FIG. 4, the stator, according to the embodiment 200 as well as the embodiment 300, is covered by an annular cover 401. The annular cover 401 not only protects the stator elements 105, but also ensures that the cooling fluid remains in the stator and that the fluid passages are well sealed. The annular cover 401 thus is coupled or connected to the guiding walls as illustrated in FIG. 9A. The annular cover 401 may be made of a whole cover or may be made of partitions or building modules to from the cover 401 over the outside surfaces of the stator. A sealing cover 401 is positioned at both sides of the stator such that all the outer surfaces of the stator are sealed.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A stator for an axial flux machine, the stator comprising:
   a central axis which corresponds to the rotational axis of the axial flux machine when mounted; and
   a first and a second port for supplying and draining a cooling fluid; and
   an inner structure, an intermediate structure and an outer structure arranged coaxially around the central axis, the intermediate structure being arranged between the inner structure and the outer structure wherein
   the outer structure comprises:
   an outer cooling channel configured to let the cooling fluid flow tangentially about the central axis; and
   the inner structure comprises:
   an inner cooling channel configured to let the cooling fluid flow tangentially about the central axis; and
   the intermediate structure comprises:
   a plurality of symmetrical arranged stator members, wherein a stator member comprises a ferromagnetic core and a coil comprising a plurality of turns wound around the ferromagnetic core;
   wherein the stator member arrangement is such that for each ferromagnetic core present in the stator, a coil is provided around the ferromagnetic core, such that each of the ferromagnetic cores present in the stator makes part of a stator member functioning as an electromagnet in the axial flux machine;
   wherein the stator further comprises a plurality of guiding walls, each of the guiding walls located between two adjacent stator members, and each of the guiding walls comprising an electrically insulating material, the material of the guiding walls thus not influencing the stator functioning when used in the axial flux machine, wherein the shape and material of the guiding walls are adapted to guide the cooling fluid when flowing between the stator members, via fluid passages forming a connection between the outer and the inner cooling channel, such that a fluid flowing through the fluid passages is forced by the guiding walls to flow against the coils, thereby contributing to efficient cooling of the coils.

2. The stator according to claim 1, wherein each of the guiding walls is located between two adjacent stator members and extends in radial direction.

3. The stator according to claim 1, wherein the turns are arranged to shape a spacing between two or more adjacently wound consecutive turns of a coil, a spacing arranged to shape radial channels as fluid passages between the outer and inner cooling channels; and wherein the guiding walls are further configured to force the cooling fluid to flow through the radial channels.

4. The stator according to claim 3, wherein the turns have a tapered cross-section comprising a first end larger than a second end, the first end facing the ferromagnetic core when wound such that the radial channels comprise a V-shaped cross section.

5. The stator according to claim 1, wherein the outer cooling channel comprises the first port, and the inner cooling channel comprises the second port, such that a fluid flowing through the fluid passages all flows from the outer cooling channel to the inner cooling channel or vice versa.

6. The stator according to claim 1, wherein the outer channel comprises a partition thereby forming a first partitioned outer channel and a second partitioned outer channel the first partitioned outer channel comprising the first port, and the second partitioned outer channel comprising the second port, such that the fluid passages are arranged according to an alternating pattern, comprising fluid passages through which fluid flows from the first partitioned outer channel to the inner cooling channel, and fluid passages through which fluid flows from the inner cooling channel to the second partitioned outer channel.

7. The stator according to claim 1, wherein the intermediate structure further comprises an annular cover arranged to seal outside surfaces of the stator.

8. The stator according to claim 7, wherein the annular cover comprises a plurality of structural elements configured to compose the annular cover.

9. The stator according to claim 1, wherein the outer structure comprises a plurality of structural modules configured to compose the outer structure.

10. The stator according to claim 1, wherein the guiding walls comprise a polymer.

11. The stator according to claim 1, wherein the guiding walls have a thickness of around 0.1 mm to around 1.0 mm, preferably of around 0.5 mm.

12. An axial flux machine comprising a stator according to claim 1.

13. A method for cooling a stator for an axial flux machine, the stator being according to claim 1, the method comprising the steps of:

letting a cooling fluid flow tangentially about the central axis through the outer and inner cooling channel; and letting the cooling fluid flow between the outer and the inner cooling channel through the fluid passages, the cooling fluid thereby flowing between the stator members while being guided by the guiding walls, wherein the cooling fluid flowing through the fluid passages, is forced by the guiding walls to flow against the coils, thereby contributing to efficient cooling of the coils.

* * * * *